(12) United States Patent
Tatsuno

(10) Patent No.: US 7,507,942 B2
(45) Date of Patent: Mar. 24, 2009

(54) ILLUMINATION APPARATUS THAT SUPPRESSES LIGHT INTENSITY DISTRIBUTION IRREGULARITY AND PROJECTION-TYPE DISPLAY APPARATUS USING THE ILLUMINATION APPARATUS

(75) Inventor: Hibiki Tatsuno, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/808,700

(22) Filed: Jun. 12, 2007

(65) Prior Publication Data

US 2007/0297170 A1    Dec. 27, 2007

(30) Foreign Application Priority Data

Jun. 13, 2006  (JP)  ............................ 2006-163352
Jul. 27, 2006  (JP)  ............................ 2006-204677

(51) Int. Cl.
  *G01J 1/32*  (2006.01)
(52) U.S. Cl. ...................... 250/205; 250/216
(58) Field of Classification Search ............. 250/208.1, 250/216, 205, 201.5; 359/649–663, 716–753, 359/800; 353/69, 70, 102, 38; 345/48, 84, 345/690, 694
See application file for complete search history.

(56) References Cited

U.S. PATENT DOCUMENTS 6,677,573 B1 *  1/2004  Nakata et al. ................ 250/216
6,761,457 B2 *  7/2004  Wada et al. .................... 353/70

FOREIGN PATENT DOCUMENTS

| JP | 11-032278 | 2/1999 |
| JP | 2001-249400 | 9/2001 |
| JP | 2001-343706 | 12/2001 |
| JP | 2002-244211 | 8/2002 |
| JP | 2004-177435 | 6/2004 |
| JP | 3585097 | 8/2004 |
| JP | 2005-117602 | 4/2005 |
| JP | 2005-266137 | 9/2005 |
| JP | 2005-278132 | 10/2005 |

(Continued)

OTHER PUBLICATIONS

H. Nakanishi et al., "A new bright single panel LC-projection system without mosaic color filter," Liquid Crystal Labs., Sharp Corp., pp. 1-5, no date.

*Primary Examiner*—Que T Le
(74) *Attorney, Agent, or Firm*—Dickstein Shapiro LLP

(57) ABSTRACT

An illumination apparatus includes: a light source including at least one light-emitting element, the light-emitting element being configured to emit light and having an uneven light distribution characteristic; a coupling optical system disposed corresponding to the light source and configured to convert the light emitted from the light source into substantially parallel light; a light condensing optical system configured to condense the light from the light source, converted into the substantially parallel light by the coupling optical system, at a predetermined focal position; an illuminated surface as an object to be illuminated by the light from the light source condensed by the light condensing optical system; and an optical element disposed between the coupling optical system and the light condensing optical system, and configured to reduce irregular distribution of an amount of light on the illuminated surface caused by the light distribution characteristic of the light-emitting element.

18 Claims, 7 Drawing Sheets

FOREIGN PATENT DOCUMENTS

| | | |
|---|---|---|
| JP | 2006-017951 | 1/2006 |
| JP | 2006-017952 | 1/2006 |
| JP | 2006-067551 | 3/2006 |
| JP | 2006-071817 | 3/2006 |
| JP | 2006-84753 | 3/2006 |
| JP | 2006-251329 | 9/2006 |
| JP | 2006-330328 | 12/2006 |
| JP | 2007-47335 | 2/2007 |
| JP | 2007-47418 | 2/2007 |
| JP | 2007-47707 | 2/2007 |
| JP | 2007-58163 | 3/2007 |
| JP | 2007-72172 | 3/2007 |

* cited by examiner

ILLUMINATION APPARATUS THAT SUPPRESSES LIGHT INTENSITY DISTRIBUTION IRREGULARITY AND PROJECTION-TYPE DISPLAY APPARATUS USING THE ILLUMINATION APPARATUS

PRIORITY CLAIM

The present application is based on and claims priority from Japanese Application Number 2006-163352, filed Jun. 13, 2006, and Japanese Application Number 2006-204677, filed Jul. 27, 2006, the disclosures of which are hereby incorporated by reference herein in their entirety.

BACKGROUND

The present invention relates to an illumination apparatus, a light modulation apparatus, a display apparatus, a projection-type display apparatus and a ear-projection television. More particularly, the invention relates to an illumination apparatus, a light modulation apparatus, a display apparatus, a projection-type display apparatus and a tear-projection television having reduced irregular illumination from a light source having a light distribution characteristic.

A conventional picture display apparatus such as a projection-type picture display apparatus and a direct-view liquid crystal display apparatus and so forth modulates light illuminated from a light source by a light modulation element so as to display a picture. A liquid crystal device, a DMD (Digital Micro-mirror Device) and so on, for example, are known as light modulation elements.

The liquid crystal device utilizes properties such as optical rotatory power and double refraction, and is used together with a polarizing element to control the brightness of light passing though each pixel. The DMD includes movable micro-mirrors corresponding to the number of pixels, and controls light paths to change the brightness of light passing therethrough.

A white light lamp such as a high-pressure mercury lamp, a xenon lamp, and a metal halide lamp and so forth, for example, is generally used as the light source which illuminates the light modulation element. Drawbacks common to such white light lamps are that a large number of infrared rays are emitted, i.e., heat is generated, and the size of the entire optical system is increased due to the lamp having a large size.

In addition, it is difficult to balance an amount of light among three primary colors of R (Red), G (Green) and B (Blue) in color separation by a dichroic mirror and in color synthesis by a dichroic prism, and a large number of components are required for carrying out the color separation and the color synthesis. Thus, problems also exist such as a limitation in improvement of color reproductivity and an increase in the size of an apparatus.

In recent years, light-emitting elements such as a LED (Light-Emitting Diode), a LD (Laser Diode), an EL (Electro-Luminescence) element and so forth have been a focus of attention and developed actively. Such light-emitting elements have advantages, as compared with the xenon lamps and the metal halide lamps for example, in that they do not include components such as the infrared rays and ultraviolet rays, they are capable of performing monochromatic illumination of RGB (Red, Green and Blue), lighting control therefor is relatively easy, they have a fast response speed, and they do not rupture, for example.

On the other hand, the light-emitting elements have a disadvantage in that an amount of illumination by a single light-emitting element is small, so that a large number of light-emitting elements are required in a picture display apparatus having a large screen. In addition, the LED has a characteristic in which different a light intensity distribution is indicated normally for each angle of exit, generally known as a light distribution characteristic. As illustrated in FIG. 9, when there is an angle θ from the center of directions of the exit of light, for example, in the light distribution, the light intensity in directions of θ weakens in accordance with cos θ. Due to such a characteristic, irregularity or unevenness is generated in the distribution of a light amount on a surface of an object to be illuminated as an illumination target.

Heretofore, a number of inventions which utilize the LED, LD and so on as the illumination light source have been filed, although there are only few inventions that can solve the irregularity in the light amount distribution caused by the light distribution characteristic described above. For example, Japanese patent publication No. 2001-343706, Japanese patent registration No. 3585097, and Japanese patent publication No. 2002-244211 are known. Japanese patent publication No. 2001-343706 proposes a picture display apparatus in which light emitted from light source parts, structured of LEDs and coupling lenses, is caused to enter a light valve through a condenser lens and an integrator. Japanese patent registration No. 3585097 discloses a liquid crystal display apparatus and so on in which the irregular light amount distribution is reduced by combining a plurality of LEDs with a light guide body. Japanese patent publication No. 2002-244211 proposes an image projection apparatus which balances high light-use efficiency and a small optical system, by providing polarized light conversion elements, each converting light emitted from LEDs into polarized light, correspondingly to each of the LEDs.

The picture display apparatus proposed in Japanese patent publication No. 2001-343706 aims to cause the light emitted from the plurality of light sources to enter the light valve uniformly and effectively. However, there are drawbacks in that the number of components required is large, and miniaturization is limited.

The liquid crystal display apparatus disclosed in Japanese patent registration No. 3585097 directly irradiates diffusion light emitted from the light guide body onto a light modulation member, and as a result; it cannot establish matching between the NA (Numerical Aperture) of a projection lens and the NA of an illumination optical system. Therefore, there is a problem of low light-use efficiency, i.e., a screen becomes dark even if the light modulation member is brightly illuminated, for example, in the invention disclosed in Japanese patent registration No. 3585097.

The image projection apparatus disclosed in Japanese patent publication No. 2002-244211 aims to achieve light-use efficiency and miniaturization, although the irregularity in the light amount distribution is not discussed.

For the foregoing reasons, there is a need for an illumination apparatus and so on that effectively condenses light from the light source, suppresses the irregularity in the light amount distribution on the surface of the object to be illuminated as the illumination target, and achieves miniaturization as well as thinness.

Meanwhile, in recent years, giving presentations utilizing a projector has been widely prevalent, due to the progress in miniaturization and weight saving of various types of mobile equipment, as typified by notebook type personal computers, and thus mobile equipment can be easily portable. In accordance with the prevalence of the presentation utilizing the projector, miniaturization and weight saving of the projector are also in progress. However, a light source lamp such as a halogen lamp and metal halide lamp and so forth normally used for the existing projector is relatively large-sized and heavy. Accordingly, the LED has also been brought to attention for the light source lamp as an alternative to the halogen lamp and the metal halide lamp and so forth.

Various proposals have been made for a projector apparatus including a projector type display apparatus, an image projection apparatus and so on, in which the LED is used as the light source.

For example, Japanese patent publication No. 2001-249400 discloses a projector apparatus structured of a light-emitting element array, a fly-eye lens, a relay lens, a liquid crystal panel, and a projection lens system. Japanese patent publication No. H11-32278 discloses a projector apparatus structured of a light-emitting element array, a micro-lens array, a reduction-optical device, a dichroic mirror, a two-dimensional micro deflecting mirror array, and a projection optical system. The image projection apparatus according to the Japanese patent publication No. 2002-244211 discussed above is structured of a light-emitting element array, a polarized light conversion element a dichroic prism, a deflection beam splitter, a liquid crystal light valve, and a projection optical system.

When focusing on an illumination apparatus of the projectors described above, the invention disclosed in Japanese patent publication No. 2001-249400 causes light emitted from the light-emitting element to directly enter the fly-eye lens. The invention of Japanese patent publication No. H11-32278 shapes light emitted from the light-emitting element by the micro-lens array, although a width of a light flux is narrowed and the light is directly guided to the two-dimensional micro deflecting mirror array after the shaping is performed.

As described above, generally in the light emitted from the LED, the intensity of emission is different for each of the angles of radiation, as represented by lengths illustrated by arrows in FIG. 9, and such a distribution of the intensity is often called the light distribution characteristic. When the structures disclosed in Japanese patent publication No. 2001-249400 and Japanese patent publication No. H11-32278 are utilized, it is obvious that the light distribution characteristic of the LED appears as irregular illuminance on the liquid crystal panel, the two-dimensional micro deflecting mirror array and so on. For example, even when a LED of a shell type is used for a light source to increase directivity of the emitted light and to decrease divergence of the light so as to lower the influence of the light distribution characteristic, the NA of the fly-eye lens becomes too small, which means that the liquid panel as a light modulation device cannot be illuminated in its entirety.

The image projection apparatus disclosed in Japanese patent publication No, 2002-244211, as described above, aims to achieve light-use efficiency and miniaturization. However, irregular illuminance is not discussed therein.

For the foregoing reasons, there is also a need for a display apparatus, a projection-type display apparatus and a rear-projection television that reduces the irregular illuminance on the light modulation device and effectively irradiates the light emitted from the light source on the entire light modulation device.

SUMMARY

The present invention is directed to an illumination apparatus, a light modulation apparatus, a display apparatus, a projection-type display apparatus and a rear-projection television that satisfy this need.

To achieve these and other advantages and in accordance with the purpose of the invention, as embodied and broadly described herein, the invention provides an illumination apparatus, which includes: a light source including at least one light-emitting element, the light-emitting element being configured to emit light and having an uneven light distribution characteristic; a coupling optical system disposed corresponding to the light source and configured to convert the light emitted from the light source into substantially parallel light; a light condensing optical system configured to condense the light from the light source, converted into the substantially parallel light by the coupling optical system, at a predetermined focal position; an illuminated surface as an object to be illuminated by the light from the light source condensed by the light condensing optical system; and an optical element disposed between the coupling optical system and the light condensing optical system, and configured to reduce irregular distribution of an amount of light on the illuminated surface caused by the light distribution characteristic of the light-emitting element.

The invention provides another illumination apparatus, which includes: a light source, the light source including at least one light-emitting element of a surface-emission type in which a plurality of light-emitting elements are arranged two-dimensionally, the light-emitting element being configured to emit light and having an uneven light distribution characteristic, and a structure having a tapered hollow part which expands its diameter toward a direction of emission of the light emitted therefrom and encapsulating therein the light-emitting element by a resin; a coupling optical system disposed corresponding to the light source and configured to convert light emitted from the light source into substantially parallel light; a light condensing optical system configured to condense the light from the light source, converted into the substantially parallel light by the coupling optical system, at a predetermined focal position; an illuminated surface as an object to be illuminated by the light from the light source condensed by the light condensing optical system; and a light-emitting region provided on the structure and from which the light of the light-emitting element is emitted externally, the light-emitting region being determined by an area of encapsulation by the resin or determined by a most expanded diameter part of the structure, and having a shape similar to a shape of the illuminated surface.

The invention provides a light modulation apparatus, which includes: an illumination apparatus, including: a light source including at least one light-emitting element, the light-emitting element being configured to emit light and having an uneven light distribution characteristic; a coupling optical system disposed corresponding to the light source and configured to convert the light emitted from the light source into substantially parallel light; a light condensing optical system configured to condense the light from the light source, converted into the substantially parallel light by the coupling optical system, at a predetermined focal position; an illuminated surface as an object to be illuminated by the light from the light source condensed by the light condensing optical system; and an optical element disposed between the coupling optical system and the light condensing optical system, and configured to reduce irregular distribution of an amount of light on the illuminated surface caused by the light distribution characteristic of the light-emitting element; and a light modulation element provided on the illuminated surface.

The invention provides a projection-type display apparatus, which includes: an illumination apparatus, including: a light source including at least three light-emitting elements each configured to emit, in time sequence, colored light each having a different color from each other, the light-emitting elements each having an uneven light distribution characteristic; a coupling optical system disposed corresponding to the light source and configured to convert the colored light emitted from the light source into substantially parallel light; a light condensing optical system configured to condense the colored light from the light source, converted into the substantially parallel light by the coupling optical system, at a predetermined focal position; an illuminated surface as an object to be illuminated by the colored light from the light source condensed by the light condensing optical system; and an optical element disposed between the coupling optical system and the light condensing optical system and configured to reduce irregular distribution of an amount of light on the illuminated surface caused by the light distribution characteristic of each of the light-emitting elements; a light modulation element configured to be driven by time division in synchronization with timing of emission of each of the colored light time-sequentially emitted from the light-emitting elements and configured to modulate the colored light; and a projection optical system configured to project the colored light modulated by the light modulation element.

The invention provides another projection-type display apparatus, which includes: an illumination apparatus, including: a light source constituting a surface light source and including a plurality of light-emitting elements each configured to emit colored light each having a different color from each other, the light-emitting elements each having an uneven light distribution characteristic; a coupling optical system disposed corresponding to the light source and configured to convert the colored light emitted from the light source into substantially parallel light; a light condensing optical system configured to condense the colored light from the light source, converted into the substantially parallel light by the coupling optical system, at a predetermined focal position; an illuminated surface as an object to be illuminated by the colored light from the light source condensed by the light condensing optical system; and an optical element disposed between the coupling optical system and the light condensing optical system and configured to reduce irregular distribution of an amount of light on the illuminated surface caused by the light distribution characteristic of each of the light-emitting elements; a plurality of light modulation elements configured to modulate the colored light emitted from the light-emitting elements; a color synthesizing element configured to synthesize the colored light modulated by the light modulation elements to synthesized light; and a projection optical system configured to project the synthesized light synthesized by the color synthesizing element.

The invention provides a display apparatus, which includes: at least one light-emitting element configured to emit light; a light condensing optical system including at least one optical component and configured to condense the light emitted from the light-emitting element, the at least one optical component including at least one aspherical surface; and a light modulation device irradiated by the light condensed by the light condensing optical system and configured to modulate the irradiated light.

The invention provides a projection-type display apparatus, which includes: a display apparatus including: at least one light-emitting element configured to emit light; a light condensing optical system including at least one optical component and configured to condense the light emitted from the light-emitting element, the at least one optical component including at least one aspherical surface; and a light modulation device irradiated by the light condensed by the light condensing optical system and configured to modulate the irradiated light; and a projection optical system configured to project image light imaged by the display apparatus.

The invention provides a rear-projection television, which includes: a display apparatus including: at least one light-emitting element configured to emit light; a light condensing optical system including at least one optical component and configured to condense the light emitted from the light-emitting element, the at least one optical component including at least one aspherical surface; and a light modulation device irradiated by the light condensed by the light condensing optical system and configured to modulate the irradiated light; a projection optical system configured to project image light imaged by the display apparatus; and a display screen onto which the image light is projected by the projection optical system.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

DETAILED DESCRIPTION

Figure 1:
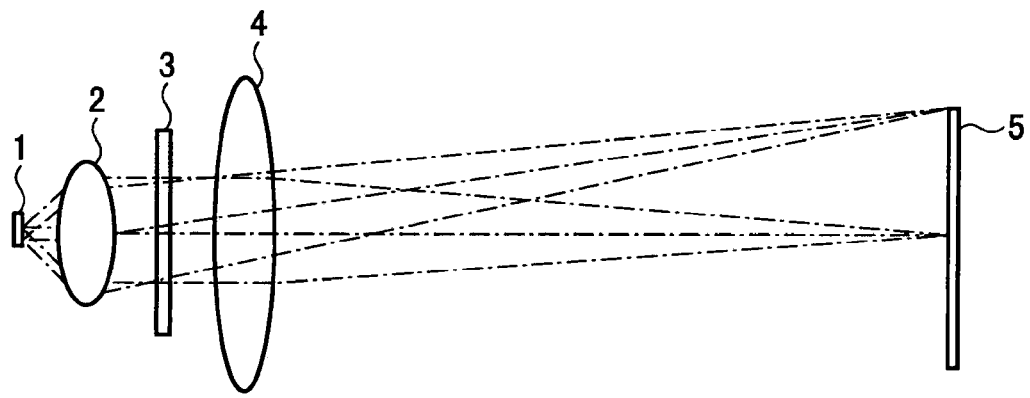
FIG. 1 is a side view illustrating a structure of an illumination apparatus according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

Figure 2:
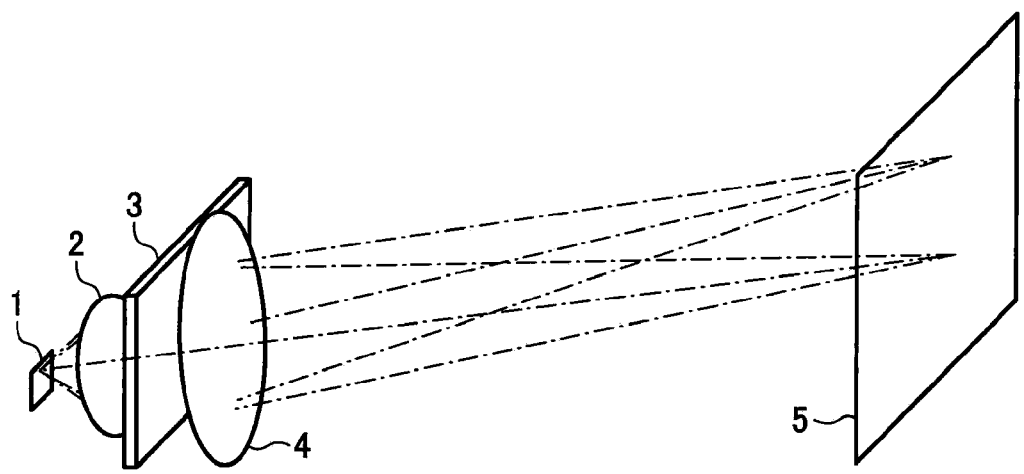
FIG. 2 is a perspective view illustrating the structure of the illumination apparatus according to the first embodiment of the present invention.
Figure 3:
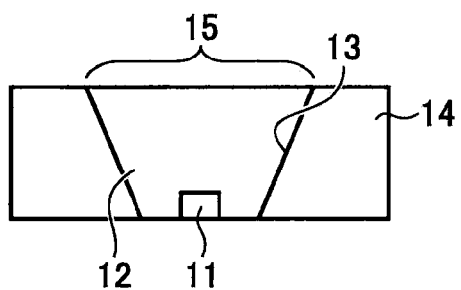
FIG. 3 illustrates a structure of an LED in the illumination apparatus according to the first embodiment of the present invention.

FIG. 1 and FIG. 2 illustrate a structure of an illumination apparatus according to a first embodiment of the present invention, wherein FIG. 1 is a side view, and FIG. 2 is a perspective view of the structure. FIG. 3 illustrates a structure of an LED in the illumination apparatus according to the first embodiment of the present invention.

The illumination apparatus according to the present embodiment of the invention includes an LED 1, a coupling lens 2, an optical element 3, a condenser lens 4 and a surface to be illuminated 5 (or an illuminated surface 5). More specifically, the illumination apparatus is structured of, from a side of a light source to a side of the illuminated surface 5, the LED 1, the coupling lens 2, the optical element 3, the condenser lens 4 and the illuminated surface 5.

The LED 1 according to the present embodiment is an LED preferably of a surface-emission type as illustrated in FIG. 3. The LED 1 includes a structure 14 having a hollow part, which has a taper-shaped slope surface 13. A light-emitting element 11 is encapsulated in the structure 14 by a resin 12. A region indicated by an arrow in FIG. 3 represents a light-emitting surface 15.

The light-emitting element 11 is a source of light-emission which preferably includes a p-n junction of a semiconductor, and emits monochromatic light or light having a nearly monochromatic color. The resin 12 may be a transparent resin or a resin including a fluorescent material, and protects the light-emitting element 11 or has an effect of converting a color of the light emitted from the light-emitting element 11 into another color. A reflecting plate 13 is provided on the taper-shaped slope surface 13, and has an effect of reflecting the light of the light-emitting element 11 emitted toward the slope surface 13 upward so as to extract the light out of the resin 12.

The coupling lens 2 has a large NA (Numerical Aperture), and converts divergent light of the LED 1 into parallel light. The condenser lens 4 condenses the light from the LED 1 at a predetermined focal position, and illuminates the illuminated surface 5 uniformly. The illuminated surface 5 is a surface of an object illuminated by the light from the LED 1.

Figure 4:
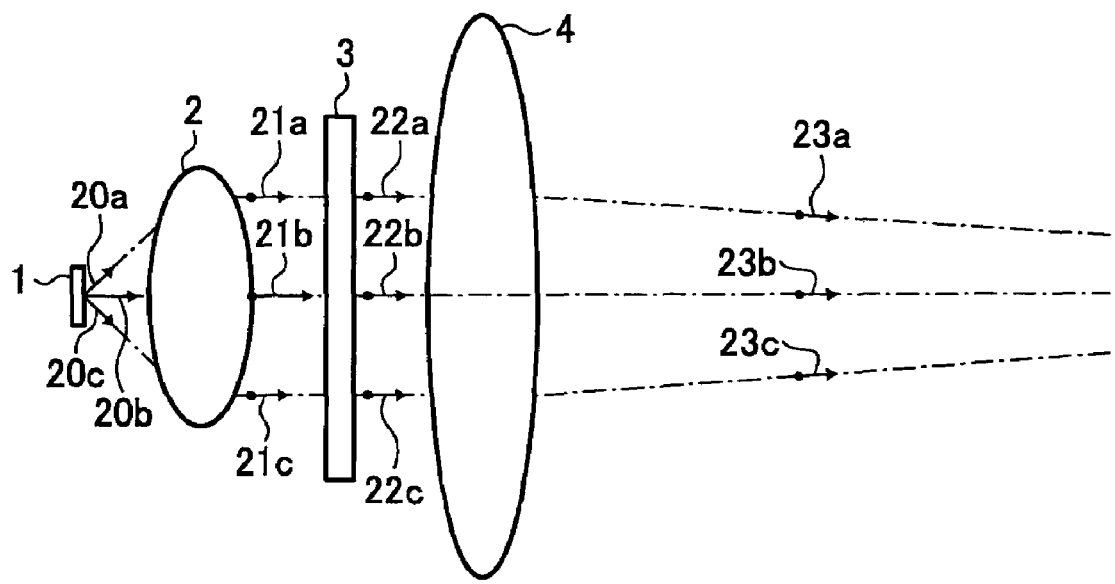
FIG. 4 illustrates a light distribution characteristic of the LED in the illumination apparatus according to the first embodiment of the present invention.

FIG. 4 is a partially-enlarged view of FIG. 1, in which arrows each representing the intensity of an amount of light are added to illustrate a light distribution characteristic of the LED 1 in the illumination apparatus according to the embodiment of the present invention.

As described above, the LED has a characteristic, generally known as the light distribution characteristic, in which a different light intensity distribution is indicated, normally, for each angle of exit. As illustrated in FIG. 4, light 20a, light 20b and light 20c each have light intensities different from each other at the point of time when they are emitted from the LED 1. The light distribution characteristics exist as illustrated by light 21a, 21b and 21c even when the light emitted from the LED 1 is converted into parallel light by the coupling lens 2. As a result, an irregularity in the light amount distribution is generated on the illuminated surface 5.

Therefore, according to the present embodiment of the invention, the optical element 3 as an element for reducing the irregularity in the light amount distribution is disposed between the coupling lens 2 and the condenser lens 4. By disposing the optical element 3, the light 21a, the light 21b and the light 21c, each having different light intensity, are converted into light 22a, light 22b and light 22c having substantially uniform light intensity. Thereafter, the light 22a, the light 22b and the light 22c, each converted to have uniform light intensity, are irradiated on the illuminated surface 5 by the condenser lens 4. Hence, the irregular light amount distribution on the illuminated surface 5 is reduced.

The LED 1 and the illuminated surface 5 are preferably set in a conjugate relationship by a lens system including the coupling lens 2, the optical element 3 and the condenser lens 4, so as to establish a so-called critical illumination. Use of an arc-type light source such as a high-pressure mercury lamp, for example, should preferably be avoided since the irregularity of the light amount in the light-emitting surface directly influences the illuminated surface. On the other hand, in the critical illumination, the irregularity of the light amount in the light-emitting surface of the surface-emission type LED is significantly less as compared with the arc-type light source, and the irregularity of the light amount is also adjustable, for example, by the reflecting surface illustrated in FIG. 3, which is effectively utilizable according to applications. The reduction of the number of components and consequent improvement in light-use efficiency are thus achieved by employing the critical illumination.

Therefore, according to the illumination apparatus of the present embodiment of the invention, the LED 1 having the uneven light distribution characteristic, the coupling lens 2, the condenser lens 4, and the illuminated surface 5 are disposed subsequently from the side of the light source, and the optical element 3 configured to reduce the uneven light amount distribution of the illuminated surface 5, caused by the light distribution characteristic of the LED 1, is disposed between the coupling lens 2 and the condenser lens 4. Hence, it is possible to achieve minaturization of the illumination apparatus. In addition, generation of heat is small since the LED 1 is used for the light source, and consequently, a cooling fan becomes unnecessary. Thus, the illumination apparatus which is noiseless is realized.

The optical element 3 is an optical system which is structured of at least two lenses and substantially afocal. The optical element 3 also includes afocal magnifications which are different in a central part of the lenses and a peripheral part of the lenses, and the optical element 3 satisfies a following formula:

$$Mc/Mm > 1$$

wherein Mc is the afocal magnification of the lens central part, and Mm is the afocal magnification of the lens peripheral part.

According to such a structure of the optical element 3, in principle, equalization of the light amount distribution is realized by giving the afocal magnification, proportional to the light intensity, to each of the lens central part and the lens peripheral part. Alternatively, the afocal magnification may be continuously changed from the lens central part to the lens peripheral part, or the magnification may be created and provided in a stepwise fashion.

The optical element 3 is arranged between the coupling lens 2 and the condenser lens 4, since light fluxes from the light-emitting element 11 have suitable widths and thus it is suitable for converting the light distribution characteristic.

However, in a case in which the light-emitting surface of the LED 1 has a certain degree of size and light emitted therefrom enters into the coupling lens 2 from outside of an optical axis, an angle of inclination in parallel light emitted obliquely from the coupling lens 2 is sharp, and thus in such a case, it is desirable that the optical element 3 be arranged near to the coupling lens 2. By way of example, a large difference in the equalization of the light amount distribution appears in the parallel light having an angle of zero degrees and the parallel light having the inclined angle, when the optical element 3 is not arranged near to the coupling lens 2. In contrast, the difference in the equalization is small when the optical element 3 is disposed near to the coupling lens 2.

Figure 5:
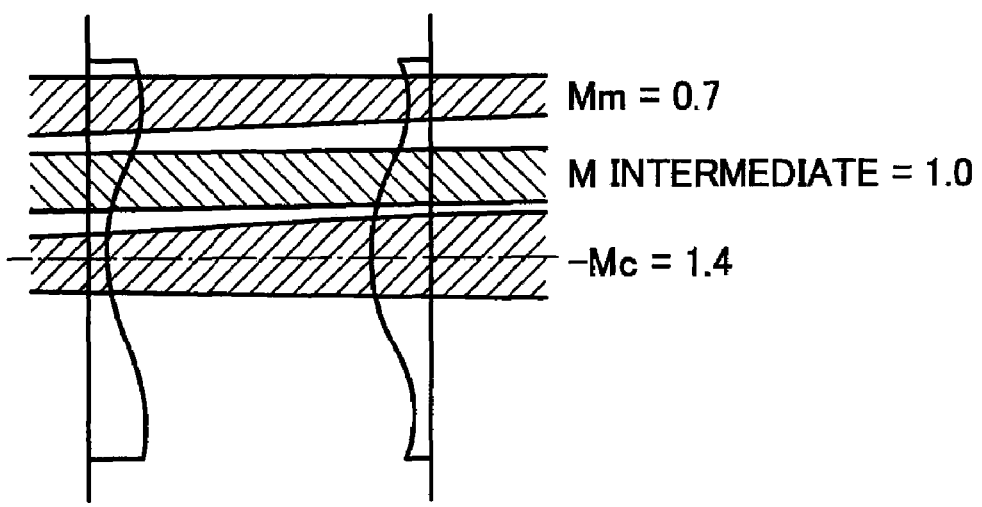
FIG. 5 illustrates one example of a structure of an optical element in the illumination apparatus according to the first embodiment of the present invention.

FIG. 5 illustrates one example of a structure of the optical element in the illumination apparatus according to the embodiment of the present invention.

For example, in a case in which the coupling lens has taken ±60 degrees of the divergent light of the light source, the intensity of a Lambert distribution or a light distribution of a lens peripheral part of the coupling lens is cos 60°=0.5, when the intensity of the Lambert distribution of a lens central part of the coupling lens, represented by a cosine function, is one. The intensity of the Lambert distribution of an intermediate part of the coupling lens is at a value in the middle of the intensity of the lens central part and the lens peripheral part represented by the cosine function.

FIG. 5 illustrates the afocal magnification Mc=1.4 of the light flux in the lens central part, and the afocal magnification Mm=0.7 of the light flux in the lens peripheral part, for example. Therefore, it is possible to equalize distribution of the intensity of the light emitted from the optical element. Here, it is possible to use three or more lenses for the optical element to improve workability, since the shape of the lenses may become complex when the optical element is structured of two lenses.

In addition, the aforcal magnification does not necessarily have to be the same in a two-dimensional direction of the lenses. The optical element 3 may be structured to have an anamorphic system to uniform the light amount distribution in each direction.

The optical element may also be structured to be an optical system which includes at least two reacting surfaces and which is substantially afocal. In this case, the lens peripheral part has an afocal magnification different from that of the lens central part, and the optical element satisfies a following formula:

$$Mc/Mm > 1$$

wherein Mc is the afocal magnification of the lens central part, and Mm is the afocal magnification of the lens peripheral part.

Now, a projection-type display apparatus according to a second embodiment of the invention will be described with reference to FIG. 6.

Figure 6:
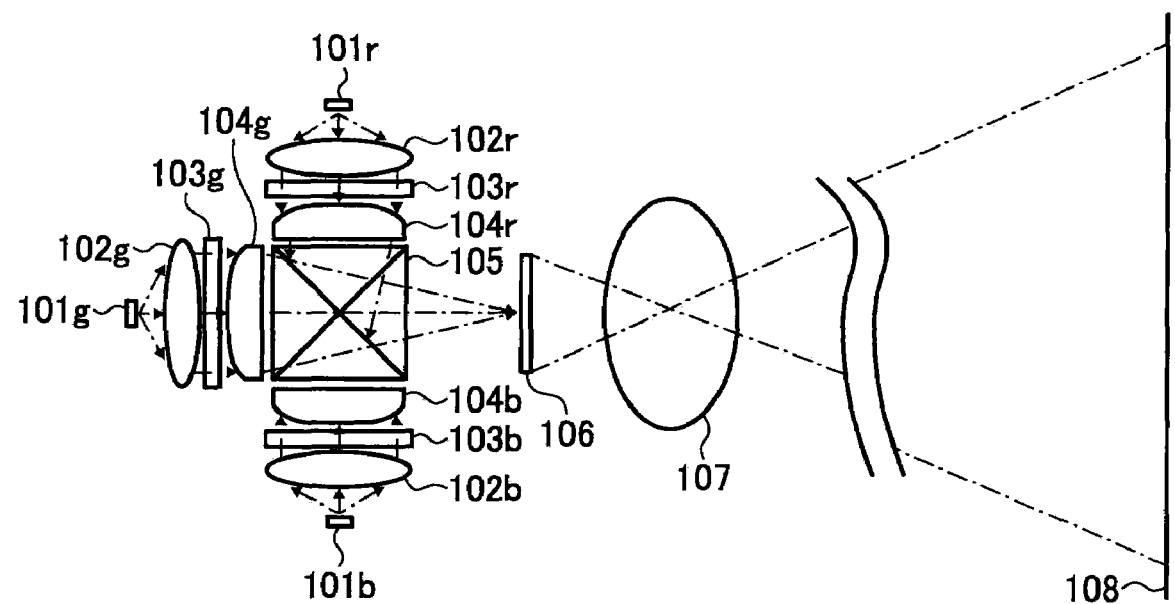
FIG. 6 illustrates a structure of a projection-type display apparatus according to a second embodiment of the present invention.

FIG. 6 illustrates a structure of optical systems of the projection-type display apparatus according to the present embodiment of the present invention. The projection-type display apparatus according to the present embodiment includes an optical system for R (Red), an optical system for G (Green), and an optical system for B (Blue). Each of the R optical system, the G optical system and the B optical system includes an LED 101, a coupling lens 102, an optical element 103, and a condenser lens 104. In FIG. 6, each of the elements belonging to the R optical system, the G optical system and the B optical system has with "r", "g" and "b" attached, respectively. The projection-type display apparatus further includes a cross dichroic prism 105, a light valve 106, and a projection lens 107.

It is to be noted that the length of the arrows illustrated in FIG. 6 does not represent the light intensity unlike in FIG. 4; rather, the arrows simply represent ray paths from the LEDs to an illuminated surface that illuminate the center of the illuminated surface. In addition, in the present embodiment, the light valve 106 is disposed at the illuminated surface.

Each of the LEDs 101 is disposed to emit colored light of one of three colors of R, G and B. The cross dichroic prism 105 is disposed, for example, as illustrated in FIG. 6, such that optical paths of the three colors at an exit of the cross dichroic prism 105 become the same as each other, and then the three colors are synthesized on the light valve 106.

The LEDs 101 and the light valve 106 are preferably set in a conjugate relationship by the lens systems including the coupling lenses 102, the optical elements 103, and the condenser lenses 104, respectively. Normally, the light valve such as a light modulation element of a liquid crystal type and the DMD, for example, has an aspect ratio of 4:3 or 16:9 or the like. Accordingly, the light-use efficiency is improved by setting the shape of a light-emitting surface of the LED 101 at 4:3 or 16:9 or the like.

The light emitted from the LEDs 101 having respective colors is modulated by the light valve 106. Light fluxes of the emitted light modulated by the light valve 106 are projected on a screen 108 through the projection lens 107. It may be desirable that the projection lens 107 be telecentric to a side of the light valve 106.

Each of the LEDs 101 of the three colors emits the corresponding colored light in time sequence. The light modulation element is driven by time division in synchronization with emission timing of each of the colored light. Thereby, color displaying is possible even on the single-plated light valve.

As described above, the LED, the LD or the like does not include an infrared ray, i.e., heat, in the light it radiates, so that use of a plastic lens is possible even in the vicinity of the light source. Hence, in addition to the fact that a reduction of costs is possible by producing members in the vicinity of the light source by molding, mass-production of an aspherical surface and a special surface is relatively easy, by which the equalization is improved. This also has an advantage of allowing the LEDs to be lightweight as compared with a glass lens.

It is also advantageous to employ a Fresnel lens for at least one of the lenses used for an illumination optical system. For example, although FIG. 6 illustrates one coupling lens and one condenser lens for convenience of explanation, both the number of coupling lenses and the number of condenser lenses used inevitably increase when attempting to obtain a bright lens system so as to increase an amount of light extracted, and as a result, a central thickness of the lenses of the illumination optical system becomes large. Therefore, in such a case, a thin, lightweight illumination optical system is achieved by replacing at least one of the lenses used in the illumination optical system with the Fresnel lens. In addition, a diffracting plane may be used at the same time to reduce a difference in the colors of the illumination light.

Figure 7:
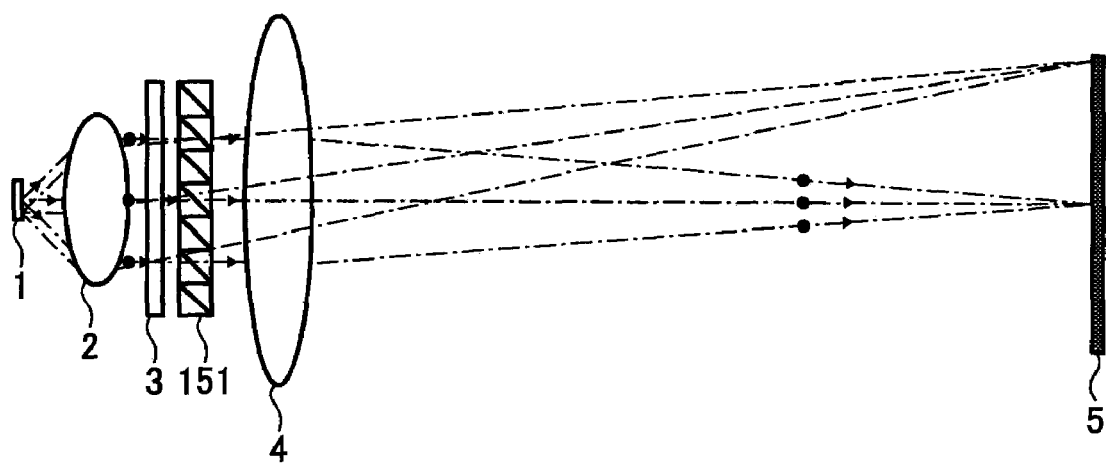
FIG. 7 illustrates a structure in which a polarization conversion element is employed.
Figure 8:
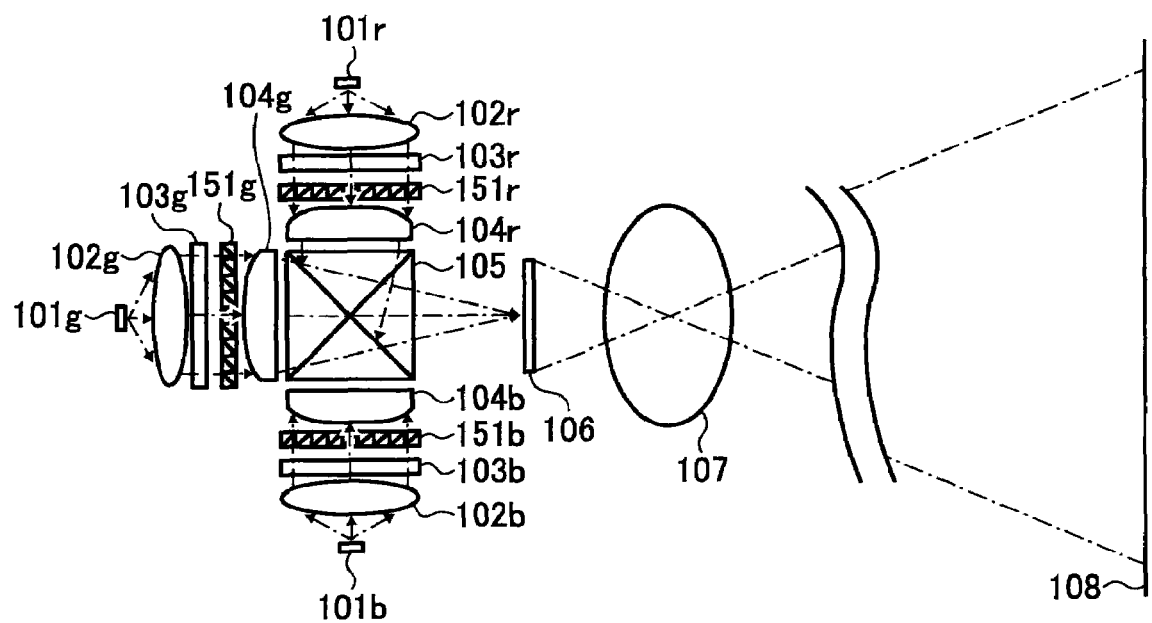
FIG. 8 illustrates another structure in which a polarization conversion element is employed.

It is possible to further improve the light-use efficiency, when a structure is employed in which a polarization conversion element (for example, a polarization conversion element 151 illustrated in FIG. 7, and polarization conversion elements 151r, 151g and 151b illustrated in FIG. 8), for arranging the light emitted from the LEDs to one-directional polarized light, is provided between the coupling lenses or the condenser lenses and the light valve, which is effective in an LCD, an LCOS (Liquid Crystal On Silicon) and so on in which the light valve utilizes polarization.

Therefore, according to the present embodiment of the invention, the optical element, which reduces the irregular light amount distribution on the illuminated surface caused by the light distribution characteristic of the light-emitting diode, is disposed between the coupling lens and the condenser lens. Hence, it is possible to achieve the miniaturization of the illumination system. Moreover, the shape of the light-emitting surface of the light-emitting diode of the surface-emission type is formed to have a shape similar to that of the light modulation element, and the light-emitting surface and the light modulation element are set in the conjugate relationship. Hence, it is possible to establish critical illumination and to reduce the number of components.

Therefore, according to the present embodiment of the invention, the illumination apparatus and so on, which effectively condense the light from the light source, suppress the irregularity in the light amount distribution on the surface of the object to be illuminated as the illumination target, and miniaturization as well as thinness are realized.

Now, a second embodiment of the invention will be described with reference to FIGS. 9 to 13.

A display apparatus according to the present embodiment of the invention includes an LED as a light-emitting element, a condenser lens system or a light condensing optical system structured of at least one optical component, and at least one aspherical surface formed on at least one optical component constituting the condenser lens system, thereby generating a desired spherical aberration in the condenser lens system to negate or cancel the light distribution characteristic of the LED.

Figure 9:
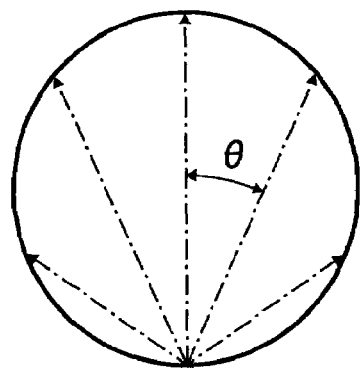
FIG. 9 illustrates a light distribution characteristic of light emitted from an LED.
Figure 10:
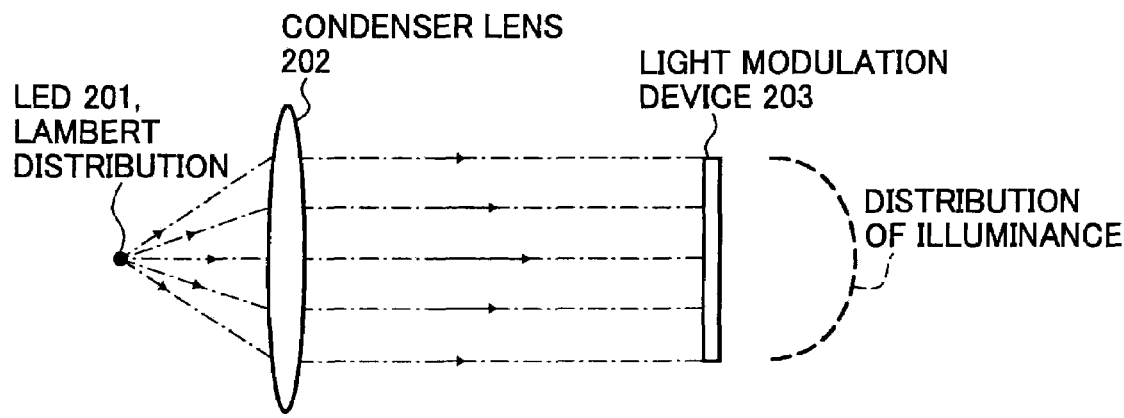
FIG. 10 illustrates a case in which the light distribution characteristic of the light emitted from the LED is a Lambert distribution.

As mentioned in the foregoing, the intensity of radiation in the light emitted from the LED differs for each angle of emission as represented by the lengths of arrows illustrated in FIG. 9. For example, in the light distribution referred to as the Lambert distribution, the intensity of radiation is increased by a $\cos\theta$ times, as an angle $\theta$ relative to the intensity of radiation in a direction front of an LED 201 is increased. More specifically, in a case in which the LFD 201 having the Lambert distribution is disposed in an object side focal point of an aberration-free lens and a light modulation device 203 is illuminated with parallel light as illustrated in FIG. 10, the distribution of illuminance on the light modulation device 203 is formed in a dome-like shape from the center to the periphery as illustrated by a dotted part of the drawing.

Figure 11:
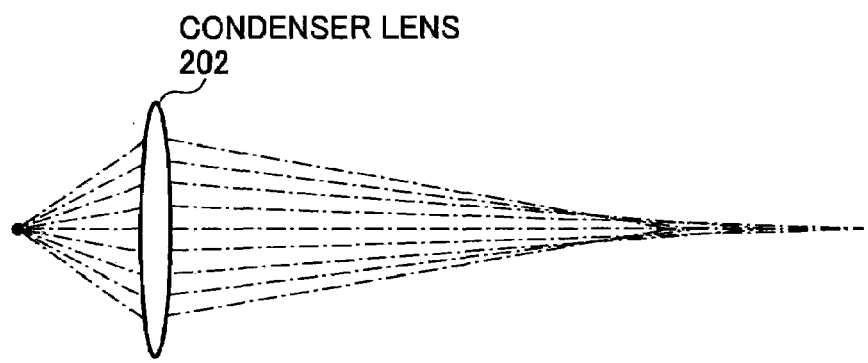
FIG. 11 illustrates a case in which a characteristic of a spherical aberration is given to the light emitted from the LED.

However, an actual lens has an aberration characteristic and thus the distribution of illumination does not appear the same as that described above. Accordingly, as illustrated in FIG. 11, the condenser lens system according to the present embodiment includes such a spherical aberration characteristic in which off-axis light intersects with an optical axis at a position nearer to a side of a condenser lens 202 than a paraxial image point.

Figure 12:
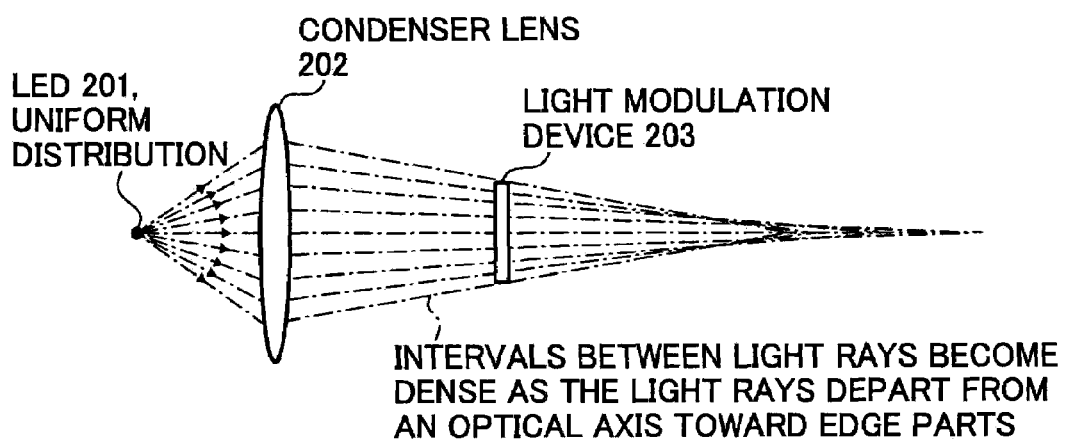
FIG. 12 illustrates a case in which the light distribution characteristic of the light emitted from the LED is a uniform distribution.

Referring to FIG. 12, by giving the spherical aberration characteristic described above to the condenser lens system, intervals between adjacent light rays of the light rays which illuminate the light modulation device become dense as the light rays diverge from the optical axis, in a case in which the light modulation device is disposed between the condenser lens system and a light-condensed point.

Thus, the illuminance on the light modulation device increases from the center to the periphery, when the light distribution of the LED is a uniform distribution as illustrated in FIG. 12.

Therefore, the display apparatus according to the present embodiment combines the characteristic in which the peripheral light amount is decreased by the light distribution with the characteristic in which the peripheral light amount is increased by the spherical aberration, to make uniform the illuminance on the light modulation device.

Here, the number of lenses inevitably increases when attempting to increase parameters in a design of lenses so as to set the spherical aberration to have a desired property. However, an increase in the number of lenses, through which illumination light passes, leads to a reduction of the light amount in illumination, an enlarged optical system, an increase in costs and so on, which are thus not desirable. Therefore, it is desirable to increase the parameters for controlling the spherical aberration by the aspherical surface, i.e., at least one aspherical surface in the condenser lens system according to the present embodiment in terms of the light amount, the size of the optical system and the costs, and, in particular, the light-use efficiency.

Various methods for performing color-displaying of a projection-type display apparatus utilizing the display apparatus described above according to the present embodiment can be considered, which may be classified into a method of performing the color-displaying by utilizing a light valve, and a method of performing the color-displaying by mixing plural colored light with an illumination optical system which includes a light source.

For example, there are methods as follows which utilize the light valve, although they sacrifice brightness and resolution:

<1> A method of using a color filter; and

<2> A method of adapting three sub-pixels of red, green and blue to correspond to one microlens (for example, see Television Gakkai Gijutu Houkoku (ITFJ Technical Report) VOL. 19, NO. 8, IDY95-41).

The following are examples of the methods of mixing the plural colored light with the illumination optical system including the light source, since each LED illuminates the entire light valve:

<1> A method of using an LED which includes respective chips of red, green and blue in one element;

<2> A method of aligning LEDs which emit respective colors of red, green and blue, and mixing colored light therefrom on a light valve; and <3> A method of aligning each LED having red, green or blue color to create a surface light source of the red color, a surface light source of the green color, and a surface light source of the blue color, and mixing colored light emitted from the respective surface light sources with a cross dichroic prism and so on.

Hereinafter, a detailed structure of the display apparatus and the projection-type display apparatus according to the present embodiment will be described with reference to FIG. 13.

Figure 13:
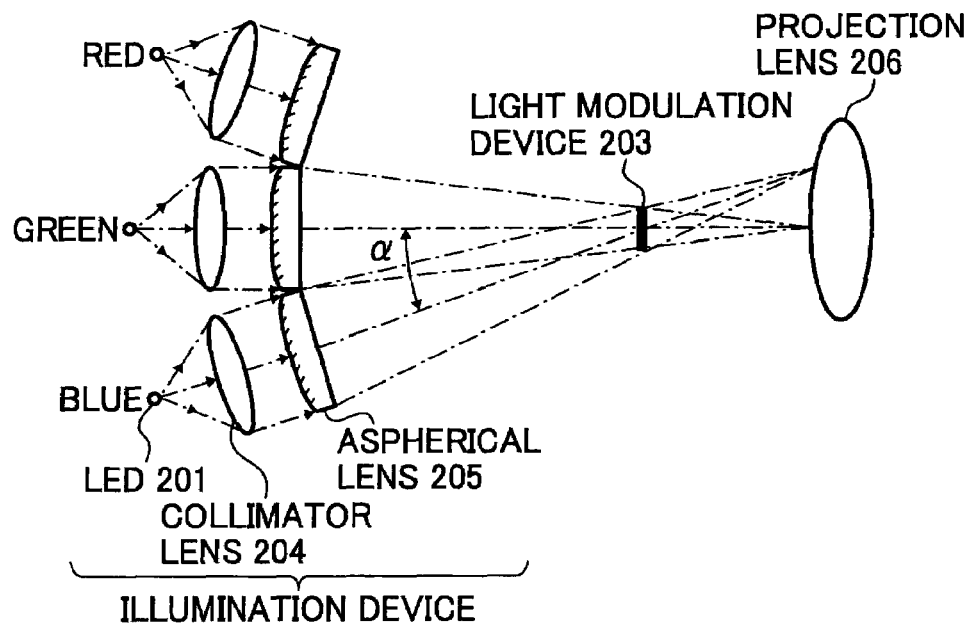
FIG. 13 illustrates a structure of a projection-type display apparatus according to a third embodiment of the present invention.

Referring to FIG. 13, the projection-type display apparatus according to the present embodiment includes an illumination device for a red color, an illumination device for a green color and an illumination device for a blue color, the light modulation device 203, and a projection lens 206. Each of the red illumination device, the green illumination device and the blue illumination device is structured of the LED 201, and the condenser lens system as a set. The condenser lens system includes a collimator lens 204, and an aspherical lens 205.

In FIG. 13, the green illumination device is disposed in front of the light modulation device 203, while each of the red illumination device and the blue illumination device is disposed to have an inclination relative to the light modulation device 203 by an angle $\pm\alpha$. Such a layout having a high degree of freedom is possible by the illumination utilizing the LEDs and is unique thereto, which is extremely difficult for a conventional light source such as a halogen lamp, a xenon lamp or the like. Here, it is desirable that the angle α be at least smaller than the NA (Numerical Aperture) of the projection lens 206.

The light modulation device 203 (or a light modulation element 203) includes a transmissive liquid crystal element, although it is not limited thereto. For example, the light modulation device 203 includes a DMD (Digital Micro-mirror Device), a reflective liquid crystal element or the like.

Therefore, the projection-type display apparatus according to the present embodiment uses the three-colored light sources of red, green and blue for the purpose of performing the color-displaying. The light modulation device 203 is driven by time division in synchronization with timing of the emission of each of the colored light time-sequentially emitted from the respective LEDs 201. Hence, the color-displaying is possible even with the single-plated light modulation device.

Figure 14:
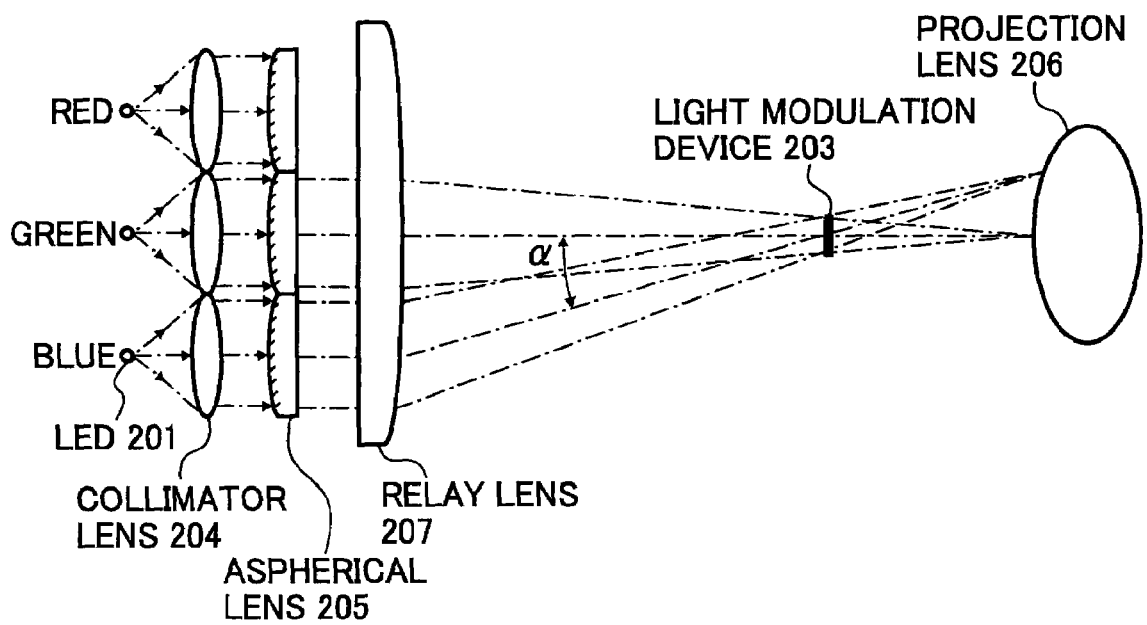
FIG. 14 illustrates a structure of the projection-type display apparatus according to a fourth embodiment of the present invention.

Now, a fourth embodiment of the invention will be described with reference to FIG. 14. Referring to FIG. 14, the projection-type display apparatus according to the present embodiment includes the red illumination device, the green illumination device and the blue illumination device, the light modulation device 203, a relay lens 207, and the projection lens 206. Each of the red illumination device, the green illumination device and the blue illumination device is structured of the LED 201, and the condenser lens system as a set, wherein the condenser lens system includes the collimator lens 204 and the aspherical lens 205. The relay lens 207 arrays light fluxes irradiated from the respective color illumination devices into one light flux.

As described in the above third embodiment of the invention, the degree of freedom in the layout of the illumination system increases significantly by using the LED for the light source. However, there may be a case in which the LEDs have to be aligned on a planar substrate. In order to cope with such a case, the projection-type display apparatus according to the present embodiment arranges each of the illumination devices in an army-like configuration, and disposes the relay lens 207 between the illumination devices, aligned in the array-like configuration, and the light modulation device 203, as illustrated in FIG. 14. Here, each of the colored light fluxes overlaps precisely on the light modulation device 203, when a focal distance of the relay lens 207 is made substantially equal to an interval between the relay lens 207 and the light modulation device 203.

Figure 15:
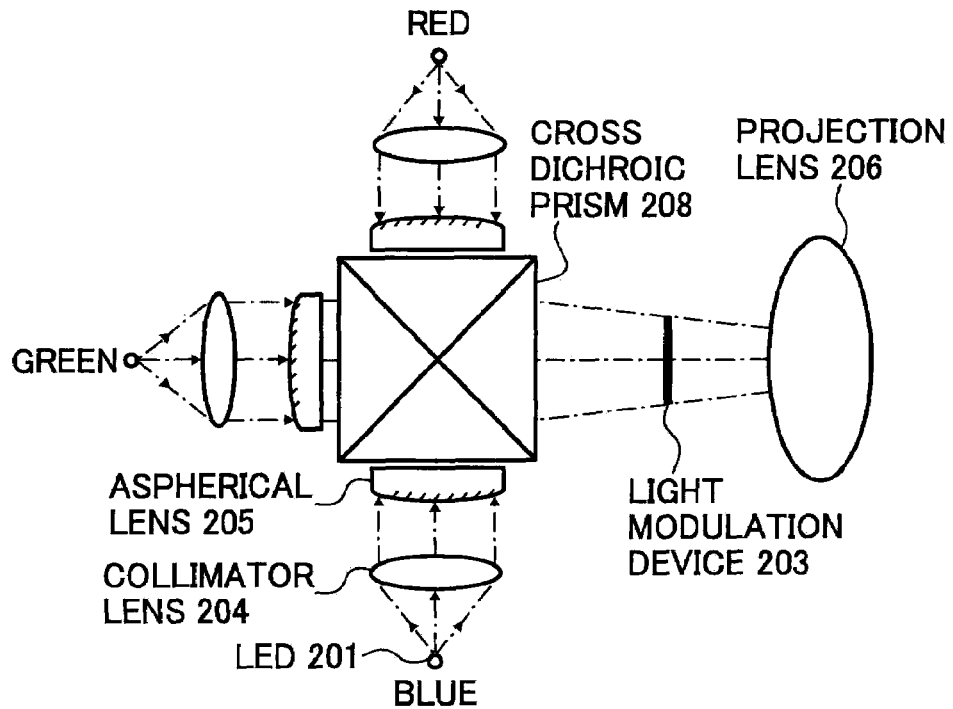
FIG. 15 illustrates a structure of the projection-type display apparatus according to a fifth embodiment of the present invention.

Now, a fifth embodiment of the invention will be described with reference to FIG. 15. Referring to FIG. 15, the projection-type display apparatus according to the present embodiment includes the red illumination device, the green illumination device and the blue illumination device, the light modulation device 203, a cross dichroic prism 208, and the projection lens 206. Each of the red illumination device, the green illumination device and the blue illumination device is structured of the LED 201, and the condenser lens system as a set, wherein the condenser lens system includes the collimator lens 204 and the aspherical lens 205.

Reduction of size of the projection lens is important when achieving miniaturization of the projection-type display apparatus. In doing so, the reduction of size is easily achieved relatively when the NA (Numerical Aperture) of the projection lens is made small and dark. However, as mentioned in the third and fourth embodiments, the necessary colored light does not reach a display screen when the NA of the projection lens is lowered by the illumination system, the same as that of the third and fourth embodiments, and thus an image is not established. Therefore, the projection-type display apparatus according to the present embodiment utilizes the cross dichroic prism 208 to make an illumination optical path, after being emitted from the cross dichroic prism 208, of each of the red and blue illumination devices to be equal with an optical path of the green illumination device, as illustrated in FIG. 15. Hence, it is possible to guide the necessary colored light to the display screen even when the NA of the projection lens 206 is made small and dark.

Figure 16:
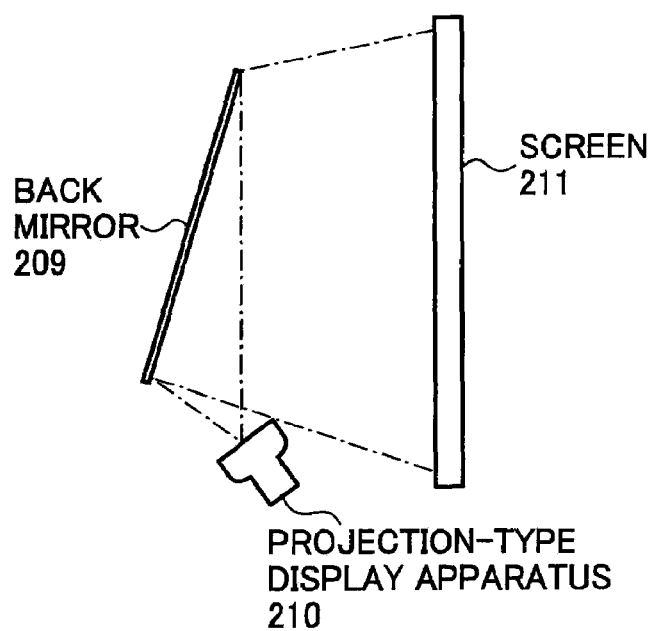
FIG. 16 illustrates a structure of a rear-projection television according to a sixth embodiment of the present invention.

Now, a sixth embodiment of the invention will be described with reference to FIG. 16. Referring to FIG. 16, the present embodiment provides a rear-projection television having a projection-type display apparatus 210 according to one of the projection-type display apparatuses of the above third to fifth embodiments, a back mirror 209, and a screen 211. A reflective off-axial optical system may be used to make the rear-projection television thin.

As described in the foregoing, according to the embodiments of the invention, it is possible to provide a small-sized display apparatus having a simple structure and having reduced or no irregular illuminance. In addition, it is possible to achieve power-saving as compared with a conventional projector, since the LED is used for the light source.

Accordingly, it is possible to achieve the following (1) to (26) from the above-described exemplary embodiments of the present invention.

(1) An illumination apparatus, including:
 a light source including at least one light-emitting element, the light-emitting element being configured to emit light and having an uneven light distribution characteristic;
 a coupling optical system disposed corresponding to the light source and configured to convert the light emitted from the light source into substantially parallel light;
 a light condensing optical system configured to condense the light from the light source, converted into the substantially parallel light by the coupling optical system, at a predetermined focal position;
 an illuminated surface as an object to be illuminated by the light from the light source condensed by the light condensing optical system; and
 an optical element disposed between the coupling optical system and the light condensing optical system, and configured to reduce irregular distribution of an amount of light on the illuminated surface caused by the light distribution characteristic of the light-emitting element.

(2) The illumination apparatus according to (1), wherein the optical element includes a refracting optical system disposed corresponding to the coupling optical system, (3) The illumination apparatus according to (1) or (2), wherein the optical element includes:
 an optical system substantially afocal and having at least two lenses;
 a lens central part defined by a central part of each of the at least two lenses and having a first afocal magnification; and
 a lens peripheral part defined by a peripheral part of each of the at least two lenses and having a second afocal magnification different from the first afocal magnification,
 and wherein the optical element satisfies a following formula:

$$Mc/Mm > 1$$

where Mc is the first afocal magnification, and Mm is the second afocal magnification.

(4) The illumination apparatus according to (1) or (2), wherein the optical element includes:

an optical system substantially afocal and having at least two refracting surfaces;

a lens central part defined by a central part of at least one lens and having a first afocal magnification; and a lens peripheral part defined by a peripheral part of the at least one lens and having a second afocal magnification different from the first afocal magnification, and wherein the optical element satisfies a following formula:

$$Mc/Mm > 1$$

where Mc is the first afocal magnification, and Mm is the second afocal magnification.

(5) An illumination apparatus, including:

a light source, the light source including at least one light-emitting element of a surface-emission type in which a plurality of light-emitting elements are arranged two-dimensionally, the light-emitting element being configured to emit light and having an uneven light distribution characteristic, and a structure having a tapered hollow part which expands its diameter toward a direction of emission of the light emitted therefrom and encapsulating therein the light-emitting element by a resin;

a coupling optical system disposed corresponding to the light source and configured to convert light emitted from the light source into substantially parallel light;

a light condensing optical system configured to condense the light from the light source, converted into the substantially parallel light by the coupling optical system, at a predetermined focal position;

an illuminated surface as an object to be illuminated by the light from the light source condensed by the light condensing optical system; and a light-emitting region provided on the structure and from which the light of the light-emitting element is emitted externally, the light-emitting region being determined by an area of encapsulation by the resin or determined by a most expanded diameter part of the structure, and having a shape similar to a shape of the illuminated surface.

(6) The illumination apparatus according to (5), wherein the light-emitting region and the illuminated surface are set in a conjugate relationship through the coupling optical system and the light condensing optical system.

(7) The illumination apparatus according to (5) or (6), wherein the resin includes a transparent resin.

(8) The illumination apparatus according to (5) or (6), wherein the resin includes a fluorescent material, and converts a color of the light emitted from the light-emitting element into another color.

(9) The illumination apparatus according to (5), further including an optical element disposed between the coupling optical system and the light condensing optical system, and configured to reduce irregular distribution of an amount of light on the illuminated surface caused by the light distribution characteristic of the light-emitting element.

(10) The illumination apparatus according to (9), wherein the optical element includes:

an optical system substantially afocal and having at least two lenses;

a lens central part defined by a central part of each of the at least two lenses and having a first afocal magnification; and a lens peripheral part defined by a peripheral part of each of the at least two lenses and having a second afocal magnification different from the first afocal magnification, and wherein the optical element satisfies a following formula:

$$Mc/Mm > 1$$

where Mc is the first afocal magnification, and Mm is the second afocal magnification.

(11) The illumination apparatus according to (9), wherein the optical element includes:

an optical system substantially afocal and having at least two refracting surfaces;

a lens central part defined by a central part of at least one lens and having a first afocal magnification; and a lens peripheral part defined by a peripheral part of the at least one lens and having a second afocal magnification different from the first afocal magnification, and wherein the optical element satisfies a following formula:

$$Mc/Mm > 1$$

where Mc is the first afocal magnification, and Mm is the second afocal magnification.

(12) The illumination apparatus according to any one of (1) to (11), wherein the light-emitting element includes a light-emitting diode, the coupling optical system includes a coupling lens, and the light condensing optical system includes a condenser lens.

(13) A light modulation apparatus, including:

the illumination apparatus according to any one of (1) to (12); and a light modulation element provided on the illuminated surface of the illumination apparatus,

(14) The light modulation apparatus according to (13), further including a polarization conversion element disposed between the light condensing optical system and the light modulation element, and configured to arrange the light emitted from the light-emitting element to one-directional polarized light.

(15) A projection-type display apparatus, including:

the illumination apparatus according to any one of (1) to (12), wherein the light source includes at least three light-emitting elements each configured to emit, in time sequence, colored light each having a different color from each other;

a light modulation element configured to be driven by time division in synchronization with timing of emission of each of the colored light time-sequentially emitted from the light-emitting elements and configured to modulate the colored light; and a projection optical system configured to project the colored light modulated by the light modulation element.

(16) A projection-type display apparatus, including:

the illumination apparatus according to any one of (1) to (12), wherein the light source constitutes a surface light source and including a plurality of light-emitting elements each configured to emit colored light each having a different color from each other, a plurality of light modulation elements configured to modulate the colored light emitted from the light-emitting elements;

a color synthesizing element configured to synthesize the colored light modulated by the light modulation elements to synthesized light; and a projection optical system configured to project the synthesized light synthesized by the color synthesizing element.

(17) The projection-type display apparatus according to (15) or (16), further including a polarization conversion element disposed between the light condensing optical system and the light modulation elements and configured to arrange the colored light emitted from each of the light-emitting elements to one-directional polarized light.

(18) The projection-type display apparatus according to (17), wherein the light modulation elements each includes a reflective liquid crystal device.

(19) A display apparatus, including:
  at least one light-emitting element configured to emit light;
  a light condensing optical system including at least one optical component and configured to condense the light emitted from the light-emitting element, the at least one optical component including at least one aspherical surface; and
  a light modulation device irradiated by the light condensed by the light condensing optical system and configured to modulate the irradiated light.

(20) The display apparatus according to (19), wherein the light modulation device is disposed between the light condensing optical system and a light-condensed point where the light emitted from the light-emitting element is condensed by the light-condensing optical system.

(21) The display apparatus according to (19) or (20), further including a plurality of illumination devices each including the at least one light-emitting element and the light condensing optical system, and each configured to illuminate the light modulation device,

(22) The display apparatus according to any one of (19) to (21), wherein the at least one light-emitting element includes a plurality of light-emitting elements, and the plurality of light-emitting elements includes at least a red light-emitting element which emits red light, a green light-emitting element which emits green light, and a blue light-emitting element which emits blue light.

(23) The display apparatus according to (22), further including a cross dichroic prism disposed between the light condensing optical system and the light modulation device.

(24) The display apparatus according to any one of (19) to (23), further including at least one relay lens disposed between the light condensing optical system and the light modulation device.

(25) A projection-type display apparatus, including:
  the display apparatus according to any one of (19) to (24); and
  a projection optical system configured to project image light imaged by the display apparatus.

(26) A rear-projection television, including:
  the display apparatus according to any one of (19) to (24);
  a projection optical system configured to project image light imaged by the display apparatus; and
  a display screen onto which the image light is projected by the projection optical system.

Although the present invention has been described in terms or exemplary embodiments, it is not limited thereto. It should be appreciated that variations may be made in the embodiments described by persons skilled in the art without departing from the scope of the present invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. Moreover, no element or component in the present disclosure is intended to be dedicated to the public regardless of whether the element or component is explicitly recited in the following claims.

What is claimed is:

1. An illumination apparatus, comprising:
  a light source including at least one light-emitting element, the light-emitting element being configured to emit light and having an uneven light distribution characteristic;
  a coupling optical system disposed corresponding to the light source and configured to convert the light emitted from the light source into substantially parallel light;
  a light condensing optical system configured to condense the light from the light source, converted into the substantially parallel light by the coupling optical system, at a predetermined focal position;
  an illuminated surface as an object to be illuminated by the light from the light source condensed by the light condensing optical system; and
  an optical element disposed between the coupling optical system and the light condensing optical system, and configured to reduce irregular distribution of an amount of light on the illuminated surface caused by the light distribution characteristic of the light-emitting element.

2. The illumination apparatus according to claim 1, wherein the optical element includes a refracting optical system disposed corresponding to the coupling optical system.

3. The illumination apparatus according to claim 1, wherein the optical element includes:
  an optical system substantially afocal and having at least two lenses;
  a lens central part defined by a central part of each of the at least two lenses and having a first afocal magnification; and
  a lens peripheral part defined by a peripheral part of each of the at least two lenses and having a second afocal magnification different from the first afocal magnification,
  and wherein the optical element satisfies a following formula:

$$Mc/Mm > 1$$

where Mc is the first afocal magnification, and Mm is the second afocal magnification.

4. The illumination apparatus according to claim 1, wherein the optical element includes:
  an optical system substantially afocal and having at least two refracting surfaces;
  a lens central part defined by a central part of at least one lens and having a first afocal magnification; and
  a lens peripheral part defined by a peripheral part of the at least one lens and having a second afocal magnification different from the first afocal magnification,
  and wherein the optical element satisfies a following formula:

$$Mc/Mm > 1$$

where Mc is the first afocal magnification, and Mm is the second afocal magnification.

5. An illumination apparatus, comprising:
  a light source, the light source including
  at least one light-emitting element of a surface-emission type in which a plurality of light-emitting elements are arranged two-dimensionally, the light-emitting element being configured to emit light and having an uneven light distribution characteristic, and a structure having a tapered hollow part which expands its diameter toward a direction of emission of the light emitted therefrom and encapsulating therein the light-emitting element by a resin;

a coupling optical system disposed corresponding to the light source and configured to convert light emitted from the light source into substantially parallel light;

a light condensing optical system configured to condense the light from the light source, converted into the substantially parallel light by the coupling optical system, at a predetermined focal position;

an illuminated surface as an object to be illuminated by the light from the light source condensed by the light condensing optical system; and a light-emitting region provided on the structure and from which the light of the light-emitting element is emitted externally, the light-emitting region being determined by an area of encapsulation by the resin or determined by a most expanded diameter part of the structure, and having a shape similar to a shape of the illuminated surface.

6. The illumination apparatus according to claim 5, wherein the light-emitting region and the illuminated surface are set in a conjugate relationship through the coupling optical system and the light condensing optical system.

7. The illumination apparatus according to claim 5, wherein the resin includes a transparent resin.

8. The illumination apparatus according to claim 5, wherein the resin includes a fluorescent material, and converts a color of the Light emitted from the light-emitting element into another color.

9. The illumination apparatus according to claim 5, further comprising an optical element disposed between the coupling optical system and the light condensing optical system, and configured to reduce irregular distribution of an amount of light on the illuminated surface caused by the light distribution characteristic of the light-emitting element.

10. The illumination apparatus according to claim 9, wherein the optical element includes:

an optical system substantially afocal and having at least two lenses;

a lens central part defined by a central part of each of the at least two lenses and having a first afocal magnification; and a lens peripheral part defined by a peripheral part of each of the at least two lenses and having a second afocal magnification different from the first afocal magnification, and wherein the optical element satisfies a following formula;

$$Mc/Mm > 1$$

where Mc is the first afocal magnification, and Mm is the second afocal magnification.

11. The illumination apparatus according to claim 9, wherein the optical element includes:

an optical system substantially afocal and having at least two refracting surfaces;

a lens central part defined by a central part of at least one lens and having a first afocal magnification; and a lens peripheral part defined by a peripheral part of the at least one lens and having a second afocal magnification different from the first afocal magnification, and wherein the optical element satisfies a following formula:

$$Mc/Mm > 1$$

where Mc is the first afocal magnification, and Mm is the second afocal magnification.

12. The illumination apparatus according to claim 1, wherein the light-emitting element includes a light-emitting diode, the coupling optical system includes a coupling lens, and the light condensing optical system includes a condenser lens.

13. A light modulation apparatus, comprising:

an illumination apparatus, including:

a light source including at least one light-emitting element, the light-emitting element being configured to emit light and having an uneven light distribution characteristic;

a coupling optical system disposed corresponding to the light source and configured to convert the light emitted from the light source into substantially parallel light;

a light condensing optical system configured to condense the light from the light source, converted into the substantially parallel light by the coupling optical system, at a predetermined focal position;

an illuminated surface as an object to be illuminated by the light from the light source condensed by the light condensing optical system; and an optical element disposed between the coupling optical system and the light condensing optical system, and configured to reduce irregular distribution of an amount of light on the illuminated surface caused by the light distribution characteristic of the light-emitting element; and a light modulation element provided on the illuminated surface.

14. The light modulation apparatus according to claim 13, further comprising a polarization conversion element disposed between the light condensing optical system and the light modulation element, and configured to arrange the light emitted from the light-emitting element to one-directional polarized light.

15. A projection-type display apparatus, comprising:

an illumination apparatus, including:

a light source including at leas three light-emitting elements each configured to emit, in time sequence, colored light each having a different color firm each other, the light-emitting elements each having an uneven light distribution characteristic;

a coupling optical system disposed corresponding to the light source and configured to convert the colored light emitted from the light source into substantially parallel light;

a light condensing optical system configured to condense the colored light from the light source, converted into the substantially parallel light by the coupling optical system, at a predetermined focal position;

an illuminated surface as an object to be illuminated by the colored light from the light source condensed by the light condensing optical system; and an optical element disposed between the coupling optical system and the light condensing optical system and configured to reduce irregular distribution of an amount of light on the illuminated surface caused by the light distribution characteristic of each of the light-emitting elements;

a light modulation element configured to be driven by time division in synchronization with timing of emission of each of the colored light time-sequentially emitted from the light-emitting elements and configured to modulate the colored light; and a projection optical system configured to project the colored light modulated by the light modulation element.

16. A projection-type display apparatus, comprising:

an illumination apparatus, including:

a light source constituting a surface light source and including a plurality of light-emitting elements each configured to emit colored light each having a different color from each other, the light-emitting elements each having an uneven light distribution characteristic;

a coupling optical system disposed corresponding to the light source and configured to convert the colored light emitted from the light source into substantially parallel light;

a light condensing optical system configured to condense the colored light from the light source, converted into the substantially parallel light by the coupling optical system, at a predetermined focal position;

an illuminated surface as an object to be illuminated by the colored light from the light source condensed by the light condensing optical system; and an optical element disposed between the coupling optical system and the light condensing optical system and configured to reduce irregular distribution of an amount of light on the illuminated surface caused by the light distribution characteristic of each of the light-emitting elements;

a plurality of light modulation elements configured to modulate the colored light emitted from the light-emitting elements;

a color synthesizing element configured to synthesize the colored light modulated by the light modulation elements to synthesized light; and a projection optical system configured to project the synthesized light synthesized by the color synthesizing element.

17. The projection-type display apparatus according to claim 15, further comprising a polarization conversion element disposed between the light condensing optical system and the light modulation elements and configured to arrange the colored light emitted from each of the light-emitting elements to one-directional polarized light.

18. The projection-type display apparatus according to claim 17, wherein the light modulation elements each includes a reflective liquid crystal device.

* * * * *